United States Patent [19]
Wilson et al.

[11] Patent Number: 5,968,865
[45] Date of Patent: Oct. 19, 1999

[54] ELECTRON DONOR CONTAINING COMPOSITIONS

[75] Inventors: Stanley Edward Wilson; Robert Converse Brady, III, both of Houston, Tex.

[73] Assignee: Union Carbide Chemicals & Plastics Technology Corporation, Danbury, Conn.

[21] Appl. No.: 08/988,291

[22] Filed: Dec. 10, 1997

[51] Int. Cl.[6] ............... B01J 31/00; B01J 37/00; C08F 4/02; C08F 4/60
[52] U.S. Cl. ............ 502/126; 502/104; 502/128; 502/132; 502/133; 526/124.3
[58] Field of Search ................. 502/104, 126, 502/128, 132, 133

[56] References Cited

U.S. PATENT DOCUMENTS

| | | | |
|---|---|---|---|
| 4,107,413 | 8/1978 | Giannini et al. | 526/114 |
| 4,107,414 | 8/1978 | Giannini et al. | 526/114 |
| 4,393,182 | 7/1983 | Goodall et al. | 526/125 |
| 4,710,482 | 12/1987 | Job | 502/127 |
| 4,946,816 | 8/1990 | Cohen et al. | 502/126 |
| 4,971,936 | 11/1990 | Wilson et al. | 502/124 |
| 5,077,357 | 12/1991 | Job | 526/119 |
| 5,093,415 | 3/1992 | Brady, III et al. | 526/124 |
| 5,132,261 | 7/1992 | Murata et al. | 502/126 |

FOREIGN PATENT DOCUMENTS

| | | |
|---|---|---|
| 831230 | 9/1993 | Belgium . |
| 0585796A1 | 8/1993 | European Pat. Off. . |
| 3427867 | 9/1993 | Germany . |
| 3633131 | 9/1993 | Germany . |
| 4048638 | 8/1993 | Japan . |
| 1297408 | 9/1993 | Japan . |
| 23278 | 3/1994 | Japan . |
| 2613169 | 2/1997 | Japan . |
| 97/31954 | 9/1997 | WIPO . |

OTHER PUBLICATIONS

94291–49–3 Chem. Abstract. Registry Number.

*Primary Examiner*—Mark L. Bell
*Assistant Examiner*—J. Pasterczyk
*Attorney, Agent, or Firm*—P. A. Doody

[57] ABSTRACT

A composition containing a magnesium component, a titanium component, a halide and a 1,2-dialkoxybenzene, wherein at least one alkoxy group has at least two carbon atoms, and the manufacture of the composition are taught by the present invention. The compositions are useful as Ziegler-Natta catalysts in the production of olefin polymers.

20 Claims, 2 Drawing Sheets

ELECTRON DONOR CONTAINING COMPOSITIONS

BACKGROUND OF THE INVENTION

To polymerize olefins Ziegler-Natta catalysts are used. These catalysts contain a procatalyst made from an internal electron donor, a titanium source, a magnesium source and a halogenating agent (which may be combined with one of the other components). The use of Ziegler-Natta catalysts is known where this procatalyst is combined with a cocatalyst and commonly with an external electron donor, or more commonly called an external selectivity control agent ("SCA"). See, e.g., U.S. Pat. No. 5,093,415 to Brady et al.

One class of electron donors taught by the art is veratrole (1,2-dimethoxybenzene) and certain derivatives thereof which incorporate additional substituents on the benzene ring, U.S. Pat. No. 4,971,936 to Wilson et al. See also U.S. Pat. No. 4,107,413 to Giannini et al. However, these specific compounds have certain deficiencies in that catalysts made with them have low catalytic activity (<20 kg polymer/g procatalyst per hour) and produce polymers of low crystallinity (e.g., isotactic polypropylene with a xylene soluble of greater than 30% wt and a $L_{(iso)}$ ($^{13}$C NMR) of less than 50 even with a SCA). The use of these electron donor compounds solely to produce polymers of low crystallinity is confirmed in Japanese patent application Nos. 2613169 and H1-307519. It is desirable to find electron donors which result in catalysts of improved activity and selectivity.

SUMMARY OF INVENTION

The catalyst of the present invention is a high activity olefin polymerization catalyst and its use results in the production of crystalline polyolefin product with good properties in an improved yield. The catalyst is composed of a procatalyst, a cocatalyst and an SCA. The procatalyst has magnesium, titanium, halide and an internal electron donor as essential components. At least one of the electron donors ("ED"), either the internal ED or the SCA, is of the family of 1,2-dialkoxybenzene wherein each alkoxy group may be the same or different and has from one to ten carbon atoms with the proviso that at least one of the alkoxy groups has more than one carbon atom. Thus, the compositions contain at least magnesium, titanium, halide and the aforementioned ED. The use of these compositions in olefin polymerization processes and the manufacture of these compositions are also taught herein.

DETAILED DESCRIPTION OF THE INVENTION

A. Procatalyst

Figure 1:
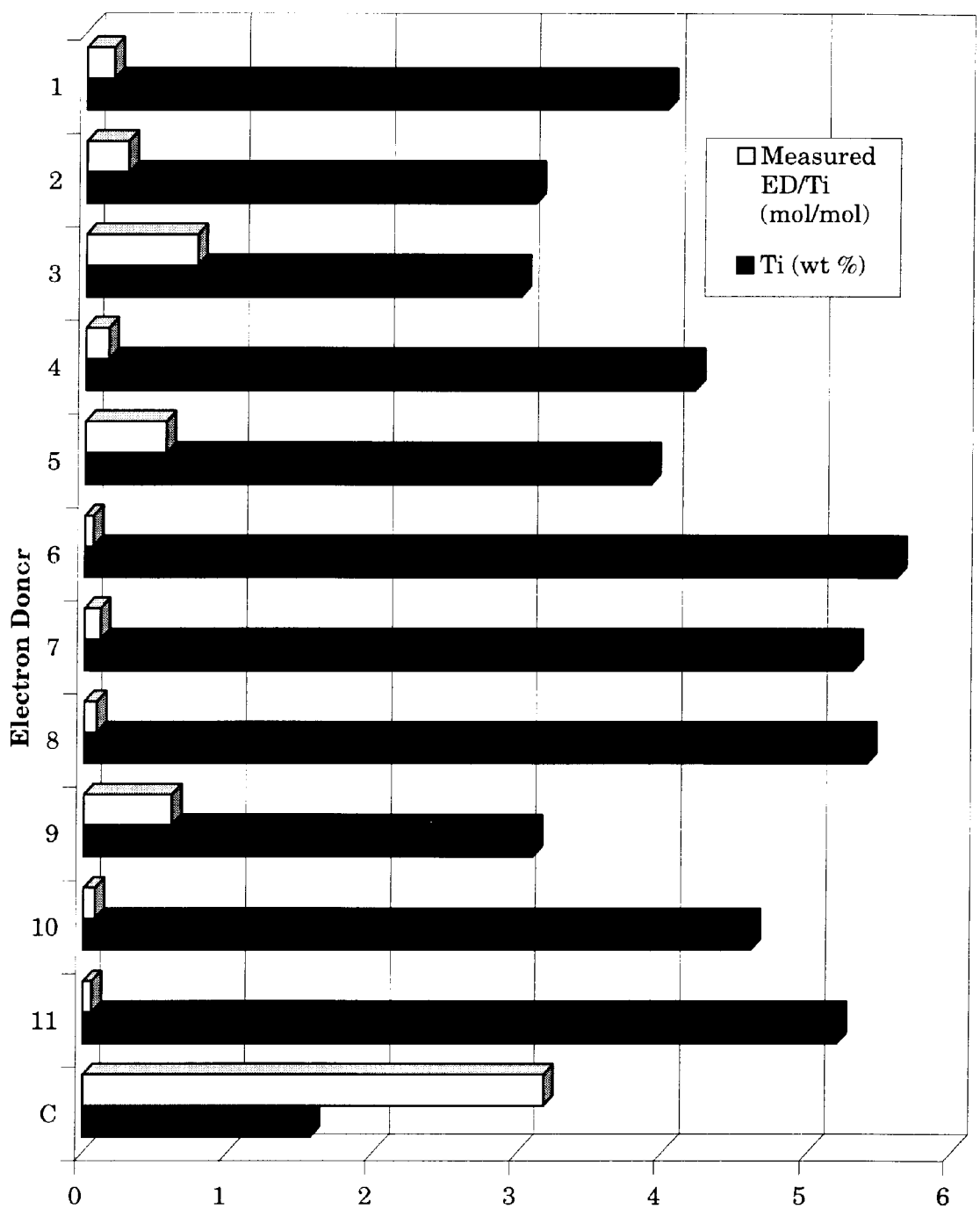
FIG. 1 is a plot of the content of various electron donor containing procatalysts (1–11 and C).

The procatalyst contains magnesium, titanium, halogen and an internal ED. The halide is introduced into the procatalyst with either the magnesium or titanium source.

i. Magnesium

The magnesium source may be a magnesium halide, alkyl, aryl, alkaryl, alkoxide, alkaryloxide or aryloxide, alcohol adducts of these compounds and carbonated complexes thereof, but preferably is a carbonated magnesium dialkoxide or a carbonated magnesium diaryloxide. Magnesium compounds containing one alkoxide and one aryloxide group can also be employed, as well as magnesium compounds containing a halogen in addition to one alkoxide, alkaryloxide or aryloxide group. The alkoxide groups, when present, most suitably contain from 1 to 8 carbon atoms, preferably from 2 to 6 carbon atoms. The aryloxide groups when present, most suitably contain from 6 to 10 carbon atoms. When halogen is present, it is preferably chlorine.

Among the magnesium dialkoxides and diaryloxides which can be employed are those of the formula $Mg(O(C(O)OR')_x(OR'')_{2-x}$, wherein R' and R" are alkyl, alkaryl or aryl groups, and x is about 0.1 to about 2. The most preferable magnesium compound is carbonated magnesium diethoxide (CMEO),

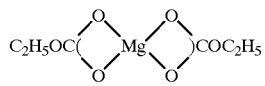

optionally, the magnesium may be halogenated with an additional halogenating agent, e.g., thionyl chloride or alkylchlorosilanes, prior to its contact with the tetravalent titanium source.

A somewhat different type of magnesium source is described by the general formula $$Mg_4(OR^3)_6(R^4OH)_{10}A \qquad (I)$$

in which each $R^3$ and $R^4$ is a lower alkyl of up to 4 carbon atoms inclusive and A is one or more anions having a total charge of −2. The manufacture of this magnesium source is disclosed in U.S. Pat. No. 4,710,482 to Job which is incorporated herein by reference.

Another magnesium source is one that contains moieties of magnesium and titanium and probably moieties of at least some of halide, alkoxide and a phenolic compound. Such complex procatalyst precursors are produced by contacting a magnesium alkoxide, a titanium alkoxide, a titanium halide, a phenolic compound and an alkanol. See U.S. Pat. No. 5,077,357 to Job, which is incorporated herein by reference.

ii. Titanium

The titanium source for the procatalyst is a tetravalent titanium which contains at least two halogen atoms, and preferably contains four halogen atoms, i.e., $Ti(OR^5)_nX_{4-n}$ wherein $R^5$ is a hydrocarbon, X is a halide and n is from 0 to 2. Most preferably these halogen atoms are chlorine atoms. The hydrocarbon preferably is an aryl, alkyl or alkaryl. Titanium compounds containing up to two alkoxy, alkaryloxy or aryloxy groups can be employed. The alkoxy groups, when present, most suitably contain from 1 to 8 carbon atoms, preferably 2 to 6 carbon atoms. The aryloxy or alkaryloxy groups, when present, most suitably contain from 6 to 12 carbon atoms, preferably from 6 to 10 carbon atoms. Examples of suitable alkoxy- and aryloxy-titanium halides include diethoxy titanium dibromide, isopropoxy titanium triiodide, dihexyloxy titanium dichloride, and phenoxy titanium trichloride. The most preferred titanium compound is $TiCl_4$.

iii. Internal Electron Donor

The ED is either an ED known to one of skill in the art or is a 1,2-dialkoxybenzene, wherein at least one of the two alkoxy functionalities have at least two carbon atoms. This latter ED may be represented by the formula

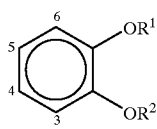

(I)

wherein R¹ and R² are alkyls of $C_1$–$C_{10}$, preferably $C_2$–$C_6$, which may be linear, branched or cyclic and 3–6 refer to positions on the benzene ring which optionally may be substituted; however, R¹ and R² may not both be methoxy.

R¹ and R² may be the same or different from each other. When the branching of R¹ and R² is at the carbon attached to the oxygen atom, the donor does not attach to the catalyst well, so it is preferred to have any steric bulk created by branching at least one carbon away from the oxygen atom (e.g., isopentoxy). Specific alkoxy groups are propoxy, n-butoxy, pentoxy, isopentoxy, hexyloxy, n-octyloxy, 3-cyclohexylpropoxy and 4-cyclopentyl butoxy. Preferably, at least one alkoxy group is an ethoxy.

There may be substitutents at the 3 to 6 positions (see structure I above) on the benzene ring, e.g., a hydrocarbon of less than ten carbon atoms (including an alkyl (e.g., methyl or t-butyl), an aryl (e.g., napthyl), a cycloaliphatic (e.g., cyclopentyl) or an alkaryl), a hydrocarboxyl of less than ten carbon atoms (e.g., alkoxy, aryloxy or alkaryloxy), a silyl group (e.g., silyl or trimethyl silyl) or a halogen (e.g., Cl or F). Preferably, there is only one or no substitutions on the benzene ring. If there is one substituent, preferably it is at the four position.

Some specific ED structures include 1-ethoxy-2-methoxy-3-methylbenzene; 1,2-diethoxy-3-fluorobenzene; 1,2-diethoxy-3-methyl-benzene; 1,2-diethoxy-4-t-butylbenzene; 1,2-diethoxy-3-trimethylsilyl-benzene; 1-ethoxy-2-n-propoxybenzene; 1,2-di-n-propoxybenzene; 1,2-diisopentoxybenzene; 1,2-diethoxynaphthalene; 2,3-diethoxy-5,6,7,8-tetrahydronaphthalene; 1,2-di n-butoxybenzene; 1-isopentoxy-2-ethoxy-3-fluoro-5-t-butylbenzene; and 1-ethoxy-2-n-hexoxybenzene. The preferable ED is 1-ethoxy-2-isopentoxybenzene.

Optionally, other EDs may be used, which may be those EDs free from active hydrogens which are conventionally employed in the formation of titanium-based procatalysts. Such EDs include, but are not limited to ethers, esters, ketones, amines, imines, nitriles, phosphines, stibines, and arsines. The preferred EDs are esters, particularly alkyl, cycloalkyl or aryl esters of aromatic monocarboxylic or dicarboxylic acids. Examples of such EDs are methyl benzoate, ethyl benzoate, p-ethoxyethyl-benzoate, ethyl p-ethylbenzoate, diethyl phthalate, dimethyl naphthalene dicarboxylate, diisobutyl phthalate (DIBP) and diisopropyl phthalate. The ED is a single compound or is a mixture of compounds but preferably the ED is a single compound. Of the preferred ester EDs, ethyl benzoate and DIBP are particularly preferred if a standard ED is used.

a. ED Manufacture

The EDs of structure I may be manufactured using 2-ethoxy phenol (e.g., 2-ethoxy phenol) wherein the alkoxy is one of the desired alkoxys, which is commercially available, as a starting material. This is combined with an alkyl halide of the desired alkoxy substituent, e.g., ethyl iodide in the presence of a base. Such substitution reactions by salt elimination are known in the art. The benzene ring may be substituted at the 3–6 positions using the alcohol of the substituent in an acid catalyzed reaction in solvent at elevated temperature. Other methods for producing the EDs of structure I would be evident to one of skill in the art.

The solvent for this reaction is preferably water. Separation from water may be by phase separations known in the art, e.g., solvent extraction. It may be further purified, e.g. by distillation or filtration.

b. Optional Secondary EDs

A secondary ED of the conventionally employed EDs recited above may also be used in the formation of the procatalyst.

iv. Procatalyst Manufacture

The magnesium compound (i) is reacted (i.e., halogenated) with the tetravalent titanium halide (ii) in the presence of the ED (iii) and preferably a halohydrocarbon. Optionally, an inert hydrocarbon diluent or solvent also may be present.

The halohydrocarbon employed may be aromatic, aliphatic, or alicyclic. Most preferably, the halogen of the halohydrocarbon is chlorine. Aromatic halohydrocarbons are preferred, particularly those containing from 6 to 12 carbon atoms, preferably 6 to 10 carbon atoms. Preferably such halohydrocarbons contain 1 or 2 halogen atoms, although more may be present if desired. Suitable aromatic halohydrocarbons include, but are not limited to chlorobenzene, bromobenzene, dichlorobenzene, dichlorodibromobenzene, chlorotoluene, dichlorotoluene, and chloronaphthalene. The aliphatic halohydrocarbons contain from 1 to 12 carbon atoms, preferably from 1 to 9 carbon atoms and at least 2 halogen atoms. Suitable aliphatic halohydrocarbons include, but are not limited to dibromomethane, trichloromethane, 1,2-dichloroethane, trichloroethane, dichlorofluoroethane, hexachloroethane, trichloropropane, chlorobutane, dichlorobutane, chloropentane, trichlorofluorooctane, tetrachloroisooctane, dibromodifluorodecane, carbon tetrachloride, and trichloroethane. The alicyclic halohydrocarbons which can be employed contain from 3 to 12 carbon atoms, and preferably from 3 to 9 carbon atoms, and at least 2 halogen atoms. Suitable alicyclic halohydrocarbons include dibromocyclobutane, and trichlorocyclohexane.

The optional inert hydrocarbon diluent may be aliphatic, aromatic or alicyclic. Some exemplary diluents are isopentane, n-octane, isooctane, xylene, or toluene.

Halogenation of the magnesium compound with the halogenated tetravalent titanium halide is effected employing an excess of the titanium halide. At least 2 moles of the titanium halide should be employed per mole of the magnesium compound. Preferably from about 4 moles to about 100 moles of the titanium halide are employed per mole of the magnesium compound, and most preferably from about 4 moles to about 20 moles of the titanium halide are employed per mole of the magnesium compound.

The halohydrocarbon is employed in an amount sufficient to dissolve the titanium halide and the ED, and to adequately disperse the magnesium compound. Usually the dispersion contains from about 0.005 to about 2.0 moles of the solid magnesium compound per mole of halohydrocarbon, preferably from about 0.01 to about 1.0 mole of the solid magnesium compound per mole of the halohydrocarbon. The ED is employed in an amount sufficient to provide a molar ratio of said compound to the titanium halide of from about 0.0005:1 to about 2.0:1, preferably from about 0.001:1 to about 0.1:1. 1:100 to 100:1 by volume of halohydrocarbon to diluent may be used.

Halogenation can be effected at a temperature of from about 60° C. to about 150° C., preferably from about 90° C. to about 140° C. Generally, as the temperature is increased the ED content drops while the titanium loading rises. Usually the reaction is allowed to proceed over a period of 0.1 to 6 hours, preferably between about 0.5 to about 3.5 hours. For convenience, halogenation is usually effected at atmospheric pressure, although a range of pressures can be employed, e.g, 0.5 atm (50,700 Pa) to 5 atm (507,000 Pa). The halogenated product, like the starting magnesium compound, is a solid material which can be isolated from the liquid reaction medium by drying, filtration, decantation, evaporation, distillation or any suitable method.

After separation, the halogenated product may be treated one or more times with additional tetravalent titanium halide to remove residual alkoxy and/or aryloxy groups and maximize catalyst activity or other desired properties. Preferably, the halogenated product is treated at least twice with separate portions of the tetravalent titanium halide. Generally, the reaction conditions employed to treat the halogenated product with the titanium halide are the same as those employed during the initial halogenation of the magnesium compound, and the ED may or may not be present during this treatment, though it is preferred that it be present. The halohydrocarbon usually is employed to dissolve the titanium halide and disperse the solid, halogenated product.

To assist in the removal of residual alkoxy and/or aryloxy moiety from the halogenated product, the latter such treatment may be effected in the presence of an acid halide. While it is possible to employ the acid halide separately, for convenience it is preferable to employ it together with the titanium halide dissolved in the halohydrocarbon. If desired, the halogenated product may be treated with the acid halide before or after it is treated with the titanium compound for the second time. From 5 mmol to 200 mmol of the acid halide generally are employed per gram atom of magnesium of the halogenated product. Suitable acid halides include benzoyl chloride, phthaloyl dichloride, 2,3-naphthalenedicarboxylic acid dichloride, endo-5-norbornene-2,3-dicarboxylic acid dichloride, maleic acid dichloride, citraconic acid dichloride, and the like.

After the solid halogenated product has been treated one or more times with additional tetravalent titanium halide, it is separated from the liquid reaction medium, washed with an inert hydrocarbon to remove unreacted titanium compounds, and dried. Drying may be by filtration, evaporation, heating or other methods known in the art.

The final washed procatalyst product suitably has a titanium content of from about 0.5 percent by weight to about 6.0 percent by weight, preferably from about 1.5 percent by weight to about 4.0 percent by weight. The atomic ratio of titanium to magnesium in the final procatalyst product is suitably between about 0.01:1 and about 0.2:1, preferably between about 0.02:1 and about 0.1:1. The ED is present in the procatalyst in a ratio of ED to magnesium of from about 0.001:1 to about 10.0:1, preferably from about 0.02:1 to about 2.0:1.

B. Cocatalyst

The cocatalyst may be chosen from any of the known activators of olefin polymerization catalyst systems, but organoaluminum compounds are preferred. Such cocatalysts can be employed individually or in combinations thereof. Suitable organoaluminum cocatalysts have the formula $Al(R''')_d X_e H_f$ wherein: X is F, Cl, Br, I or OR'''', R''' are saturated hydrocarbon radicals containing from 1 to 14 carbon atoms, which radicals may be the same or different, and, if desired, substituted with any substituent which is inert under the reaction conditions employed during polymerization, d is 1 to 3, e is 0 to 2, f is 0 or 1, and d+e+f=3. Preferred aluminum compounds are $Al(i-C_4H_9)_2H$, $Al(C_2H_5)_2Cl$, $Al_2(C_2H_5)_3Cl_3$, $Al(C_2H_5)_2H$, $Al(C_2H_5)_2(OC_2H_5)$, and $Al(C_8H_{17})_3$. Trialkylaluminum compounds are particularly preferred, particularly those wherein each of the alkyl groups contains from 1 to 6 carbon atoms, e.g., $Al(CH_3)_3$, $Al(C_2H_5)_3$, $Al(i-C_4H_9)_3$, and $Al(C_6H_{13})_3$.

C. Selectivity Control Agent

The SCA is either the ED of structure I or one of those known in the art, such as silicon compounds, esters of carboxylic acids, (especially diesters), monoethers, diethers (e.g., 1,3-dimethoxypropane or 2,2-diisobutyl-1,3-dimethoxypropane), and amines (e.g., tetramethyl piperdine). The SCA is the ED of structure I, if the internal ED is not of structure I.

Preferably, the silicon compounds employed as SCAs contain at least one silicon-oxygen-carbon linkage. Suitable silicon compounds include those having the formula $R^1_m SiA_n X_p$ wherein: $R^1$ is a hydrocarbon radical containing from 1 to 20 carbon atoms, A is $-OR^2$ or $-OCOR^2$ wherein $R^2$ is a hydrocarbon radical containing from 1 to 20 carbon atoms, X is hydrogen or halogen, m is an integer having a value of from 0 to 3, n is an integer having a value of from 1 to 4, p is an integer having a value of from 0 to 1, and preferably 0, and m+n+p=4. Preferably, $R^1$ and $R^2$ are alkyl, aryl or alkaryl ligands of $C_1$–$C_{10}$. Each $R^1$ and $R^2$ may be the same or different, and, if desired, substituted with any substituent which is inert under the reaction conditions employed during polymerization. Preferably, $R^2$ contains from 1 to 10 carbon atoms when it is aliphatic and may be sterically hindered or cycloaliphatic, and from 6 to 10 carbon atoms when it is aromatic.

Examples of $R^1$ include cyclopentyl, t-butyl, isopropyl, cyclohexyl or methyl cyclohexyl. Examples of $R^2$ include methyl, ethyl, butyl, isopropyl, phenyl, benzyl and t-butyl. Examples of X are Cl and H. Preferred silicon SCAs are alkylalkoxysilanes such as diethyldiethoxysilane, diphenyl dimethoxy silane, diisobutyldimethoxysilane, cyclohexylmethyldimethoxysilane, n-propyltrimethoxysilane or dicyclopentyl dimethoxysilane.

Silicon compounds in which two or more silicon atoms are linked to each other by an oxygen atom, i.e., siloxanes or polysiloxanes, may also be employed, provided the requisite silicon-oxygen-carbon linkage is also present. Other preferred SCAs are esters of aromatic monocarboxylic or dicarboxylic acids, particularly alkyl esters, such as PEEB, DIBP, and methyl paratoluate.

In one embodiment, the SCA is a portion of the ED added during the procatalyst production if multiple ED's are used. Alternatively, both SCA and ED may be of structure I. In another embodiment the SCA is provided at the time of the contacting of procatalyst and cocatalyst.

The SCA is provided in a quantity sufficient to provide from about 0.01 mole to about 100 moles per mole of titanium in the procatalyst. It is preferred that the SCA is provided in a quantity sufficient to provide from about 0.5 mole to about 70 moles per mole of titanium in the procatalyst, with about 8 moles to about 50 moles being more preferred. Mixtures of two or more SCA's may be used.

D. Catalyst Manufacture

The components of the olefin polymerization catalyst can be contacted by mixing in a suitable reactor outside the system in which olefin is to be polymerized and the catalyst thereby produced subsequently is introduced into the polymerization reactor. The premixed components may be dried after contact or left in the contact solvent. Alternatively, however, the catalyst components may be introduced separately into the polymerization reactor. As another alternative, two of the components are partially or completely mixed with each other (e.g., premixing SCA and cocatalyst) prior to being introduced into the polymerization reactor. Another alternative is to contact the procatalyst with an aluminum alkyl halide prior to reaction with the other catalyst components. A different alternative is to pre-polymerize a small amount of olefin with the catalyst components or put any of the components on a support, e.g., silica or a non-reactive polymer.

The catalyst should have an activity of at least about 25 kg, preferably about at least above 35 kg, polymer per gram procatalyst per hour.

E. Polymerization

The olefin polymerization catalyst of the invention is useful in the polymerization of olefins and particularly in the polymerization of straight-chain alpha-olefins of up to 20 carbon atoms, inclusive, e.g., ethylene, propylene, 1-butene, 1-dodecene, or mixtures thereof, though the polymerization of di-olefins (e.g., 1,3-butadiene; 7-methyl-1,6-octadiene) are contemplated herein as well. It is preferred that alpha-olefins of 3 carbon atoms to 10 carbon atoms, such as propylene, butene-1 and pentene-1 and hexene-1, are homopolymerized, though copolymers, such as $C_2/C_3$ and $C_3/C_4$ copolymers, and terpolymers may also be produced. Moreover, multi-stage polymers may be produced with the catalyst of the present invention, e.g., a propylene homopolymer with an ethylene-propylene rubber (impact copolymer).

The invention is useful for the production of isotactic, crystalline polypropylene (iPP) and other stereospecific polymerizations. Preferably, the xylene solubles (XS) of iPP as measured according to 21 CFR 177.1520 are less than fifteen (15) percent by weight, more preferably, less than eight (8) weight percent of the polymer and even more preferably less than five weight percent of the polymer. Moreover, for iPP the $L_{(iso)}$ as measured by $^{13}C$ NMR is greater than 30, more preferably greater than 50, most preferably greater than 70.

The polymerization is conducted under polymerization conditions in a liquid phase, slurry phase or a gas-phase process employing a stirred or fluidized bed.

The reaction diluent in the liquid phase may be an inert liquid diluent or alternatively a liquid diluent which comprises the olefin, such as propylene or 1-butene, undergoing polymerization. If a copolymer is prepared wherein ethylene is one of the monomers, ethylene is introduced by conventional means. Typical polymerization conditions include a reaction temperature from about 25° C. to about 125° C. with temperatures from about 35° C. to about 90° C. being preferred and a pressure sufficient to maintain the reaction mixture in a liquid phase. Such pressures are from about 150 psi (1,034 Pa) to about 1200 psi (8,274 Pa), with pressures from about 250 psi (1,724 Pa) to about 900 psi (6,206 Pa) being preferred. The liquid phase reaction is operated in a batchwise manner or as a continuous or semi-continuous process. Subsequent to reaction, the polymer product is recovered by conventional procedures. The precise controls of the polymerization conditions and reaction parameters of the liquid phase process are known to known to persons skilled in the art.

Alternatively, the polymerization may be conducted in a gas phase process in the presence of a fluidized catalyst bed. One such gas phase process polymerization process is described in U.S. Pat. No. 4,379,759 to Goeke et al., incorporated herein by reference. The gas phase process typically involves charging to reactor an amount of pre-formed polymer particles, gaseous monomer and separately charging a lesser amount of each catalyst component. Gaseous monomer, such as propylene, is passed through the bed of solid particles at a high rate under conditions of temperature and pressure sufficient to initiate and maintain polymerization. Unreacted olefin is separated and recycled. Preferably, the recycle gas is condensed to cool the reaction or a separate condensable fluid is added to the reactor. Polymerized olefin particles are collected at a rate substantially equivalent to the production thereof. The process is conducted batchwise or by a continuous or semi-continuous process with constant or intermittent addition of the catalyst components and/or olefin to the polymerization reactor. Preferably the process is a continuous process. Typical polymerization temperatures for a gas phase process are from about 30° C. to about 120° C. and typical pressures are up to about 1000 psi (6,900 Pa), with pressures from about 100 psi (690 Pa) to about 500 psi (3,450 Pa) being preferred.

In both the liquid phase and the gas-phase polymerization processes, molecular hydrogen is added to the reaction mixture as a chain transfer agent to regulate the molecular weight of the polymeric product. Hydrogen is typically employed for this purpose in a manner known to persons skilled in the art.

The polymerization product is suitably a homopolymer as when a single olefin monomer is provided to the polymerization process. Alternatively, the process is useful for the production of copolymers or terpolymers as when two or more olefins are provided to the polymerization process of the invention such as in the production of ethylene-propylene rubber or polypropylene impact copolymers.

EXAMPLES

The following abbreviations are used in the examples.

| Abbreviation | Meaning |
| --- | --- |
| MT | A magnesium source produced as described in U.S. Pat. No. 5,077,357 |
| DEB | 1,2 diethoxybenzene (Pfaltz and Bauer) (ED) |
| DCPDMS | dicylcopentyldimethoxysilane (SCA) |
| TEAL | triethylaluminum (cocatalyst) |
| MCB | monochlorobenzene |
| XS | xylene solubles (wt %) (21 CFR 177.1520) |

ED Synthesis

This synthesis of 1-ethoxy-2-isopentoxybenzene is representative of the synthesis of the non-commercially available EDs via substitution reactions by salt elimination. 200 mmol of 2-ethoxyphenol was added to a stirring solution of 417 mmol of sodium hydroxide in 90 ml of water. Following the addition of 400 mmol of 1-bromo-3-methylbutane, the mixture was refluxed for 6 hours. The two phase liquid was extracted with hexanes. The organic phase was washed with a sodium hydroxide solution followed by a sodium chloride solution. The organic phase was then dried over magnesium sulfate and distilled. A 38% yield was obtained of the 1-ethoxy-2-isopentoxybenzene product as determined by 1H NMR.

Procatalyst Preparation 3.0 g of MT containing 12% Mg was slurried in a volume of 60 ml of a 50/50 by (vol/vol) mixture of $TiCl_4$/MCB with an ED for 60 minutes at a temperature ranging from 110 to 130° C. The resulting mixture was filtered while hot. The recovered solids were slurried in 60 ml of the fresh 50/50 mixture and ED for 60 minutes at the same temperature used in the first step. The resulting mixture was filtered while hot. The recovered solids were slurried again in 60 ml of the fresh 50/50 mixture and ED for 60 minutes at the same temperature used in the first step. The resulting mixture was filtered while hot and the solids recovered. The solids were rinsed three times with 70 ml of isooctane at room temperature, and then dried for at least two hours under flowing nitrogen. Typical recovery of the precursor was approximately 2 g. The volume of ED added to each step, the temperature, and analysis of these procatalyst preparations are shown in Table 1. A comparative example (C) of a precursor made with veratrole as the internal ED had a lower Ti content and a higher ED/Ti ratio than the EDs of the present invention. A graphical representation of the ED/Ti mole ratio and Ti wt. % for each ED containing procatalyst is set forth in FIG. 1.

TABLE I

| Example | Electron Donor | ED (ml) | Prep Temp (° C.) | Ti (wt. %) | Measured ED/Ti (mol/mol) | Productivity (kg/g precursor) | Xylene Solubles (%) |
|---------|----------------|---------|------------------|------------|--------------------------|-------------------------------|---------------------|
| 1 | 1-Methoxy-2-n-propoxybenzene | 1.0 | 110 | 4.0 | 0.19 | 60.7 | 12.9 |
| 2 | 1-Isopentoxy-2-methoxybenzene | 1.5 | 130 | 3.1 | 0.29 | 48.3 | 13.0 |
| 3 | 1-Ethoxy-2-methoxybenzene | 0.05 | 110 | 3.0 | 0.77 | 44.3 | 16.8 |
| 4 | 1-Ethoxy-2-isopentoxybenzene | 1.4 | 130 | 4.2 | 0.16 | 61.6 | 4.3 |
| 5 | 1,2-Diethoxybenzene | 1.2 | 130 | 3.9 | 0.56 | 69.3 | 4.4 |
| 6 | 1,2-Diethoxy-3-methylbenzene | 1.5 | 110 | 5.6 | 0.06 | 36.4 | 8.7 |
| 7 | 1,2-Diethoxy-3-fluorobenzene | 1.2 | 130 | 5.3 | 0.11 | 46.0 | 4.0 |
| 8 | 1,2-Diethoxy-3-(trimethylsilyl)benzene | 0.7 | 130 | 5.4 | 0.09 | 50.6 | 6.7 |
| 9 | 1,2-Diethoxy-4-t-butylbenzene | 1.5 | 130 | 3.1 | 0.61 | 36.0 | 2.8 |
| 10 | 1,2-Di-n-propoxybenzene | 1.2 | 130 | 4.6 | 0.08 | 41.4 | 7.7 |
| 11 | 1,2-Di-n-butoxybenzene | 1.6 | 130 | 5.2 | 0.06 | 40.7 | 7.7 |
| C | Veratrole | 1.0 | 130 | 1.6 | 3.18 | 2.7 | 31.2 |

Figure 2:
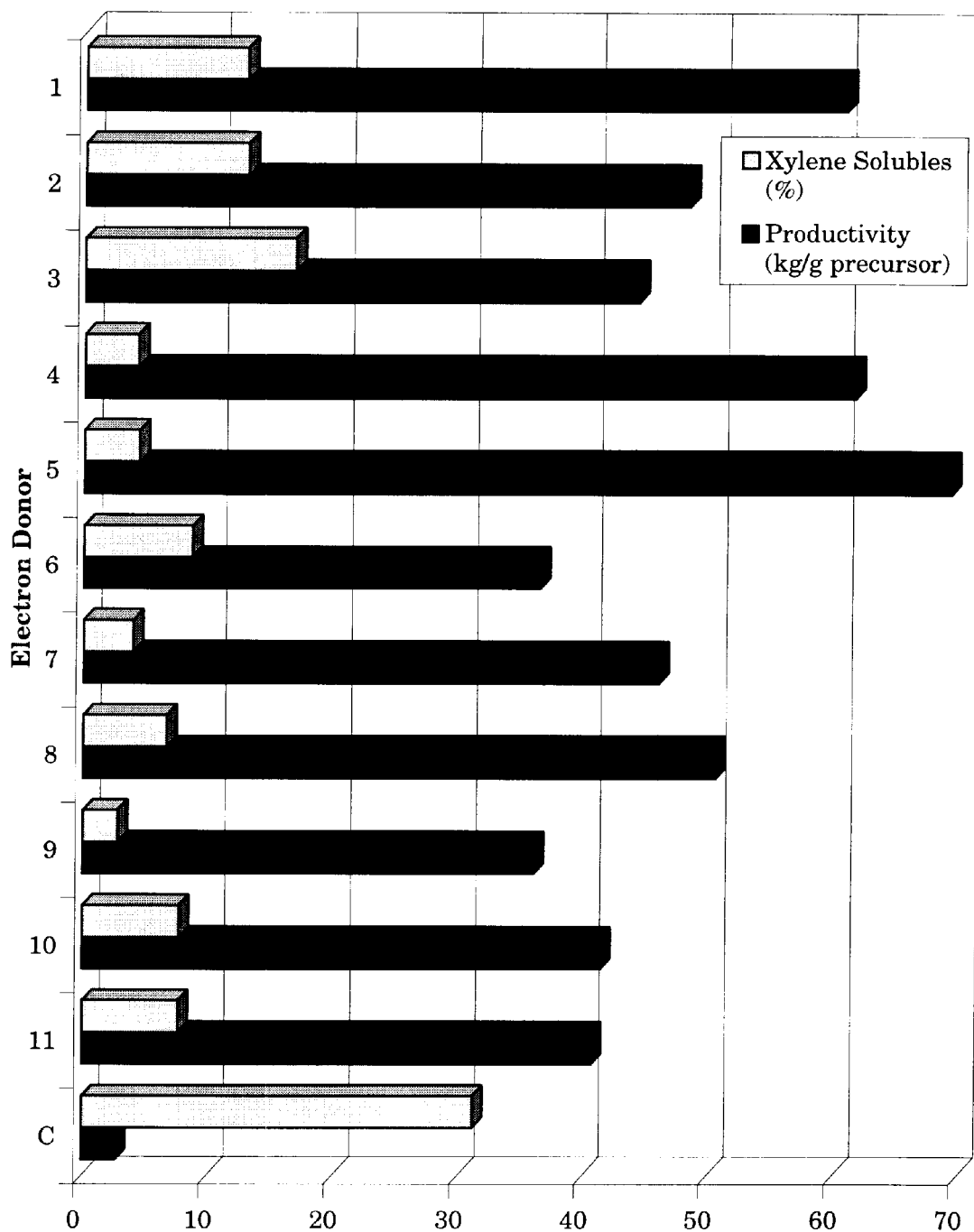
FIG. 2 is a plot of catalyst productivity for catalysts containing certain electron donors (1–11 and C) and the xylene solubles of polymer made from such catalysts.

Liquid Propylene Stirred Polymerization Procedure 2.7 l of liquid propylene was added to a cooled 1-gallon autoclave that had been dried under a stream of nitrogen at greater than 90° C. To the stirred autoclave at 62° C. were added 1.5 l of hydrogen, 58 μl of DCPDMS (0.24 mmol), 3.6 ml of 5.0% by weight TEAL solution in heptane (1.0 mmol), and 7.5 mg of procatalyst as a 5% by weight mineral oil slurry. The polymerization took place for 60 minutes at 67° C. The polymerization of the catalyst containing the ED 1-ethoxy-2-methoxybenzene took place for only 30 minutes. Therefore, the productivity was normalized to 60 minutes. The results of these polymerizations are shown in the Table 1 above wherein "Productivity" refers to the yield of polypropylene polymer in kg of polymer/g procatalyst per hour. A comparative example of polymerization with a catalyst made with veratrole as the internal ED (C) had a lower productivity and higher XS than catalysts made with EDs of the present invention. A graphical representation of the Catalyst Productivity and XS for each catalyst polymer produced thereby is shown in FIG. 2.

Gas Phase Fluid Bed Polymerization 500 g of procatalyst was prepared using 1,2-diethoxybenzene as the internal ED in larger scale equipment under procedures similar to those described for the 2 g procatalyst preparation. This procatalyst was employed together with DCPDMS and TEAL, to polymerize propylene, under varying reactor conditions, in a fluid bed reactor system similar to that described and illustrated in U.S. Pat. Nos. 4,302,565, 4,302,566 and 4,303,771. Polypropylene products with XS as low as 1.32% were obtained.

We claim:

1. A composition comprising:
   a. a magnesium component;
   b. a titanium component;
   c. a halide; and
   d. a 1,2-dialkoxybenzene wherein at least one alkoxy group has at least two carbon atoms.

2. A composition according to claim 1 wherein at least one of the alkoxy groups of (d) is ethoxy.

3. A composition according to claim 2 wherein both alkoxy groups of (d) are ethoxy.

4. A composition according to claim 1 wherein (d) is substituted at at least one of the 3 to 6 positions on the benzene ring.

5. A composition according to claim 4 wherein the substituent for (d) is selected from the group consisting of a hydrocarbyl, a hydrocarboxy, a nitro group, a silyl group and a halogen.

6. A composition according to claim 5 wherein the substituent for (d) is at the fourth position.

7. A composition according to claim 2 wherein (d) is selected from the group consisting of 1,2-diethoxy benzene and 1-ethoxy-2-isopentoxy benzene.

8. A composition according to claim 1 wherein (d) is an internal electron donor.

9. A composition according to claim 1 wherein (d) is an external electron donor.

10. A composition comprising the reaction product of:
    a. a magnesium source;
    b. $Ti(OR)_nX_{4-n}$ wherein n is an integer from 0 to 2, X is a halide and R is a hydrocarbon; in contact with
    c. a 1,2-dialkoxybenzene wherein at least one alkoxy group has at least two carbon atoms.

11. A composition according to claim 10 wherein the reaction takes place in the presence of a halohydrocarbon.

12. A composition according to claim 11 wherein component (b) is $TiCl_4$.

13. A composition according to claim 12 wherein the magnesium source is selected from: (i) magnesium containing at least one substituent selected from the group consisting of alkyl, aryl, alkaryl, halide, alkoxide, alkaryloxide and aryloxide; or (ii) carboxylated complexes thereof.

14. A composition according to claim 10 wherein the alkoxy groups of (c) are linear, branched or cyclic.

15. A process comprising reacting:
    a. a magnesium compound;
    b. $Ti(OR')_nX_{4-n}$ wherein n is from 0 to 2, X is a halide and R' is a hydrocarbon, and
    c. a 1,2-dialkoxy benzene wherein at least one alkoxy group has at least two carbon atoms, to form a reaction product.

16. A process according to claim 15 wherein the reaction takes place in the additional presence of a halohydrocarbon.

17. A process according to claim 15 comprising the additional step of further reacting the reaction product with additional (b).

18. A process according to claim 17 wherein the further reacting takes place in a halohydrocarbon.

19. A process according to claim 18 wherein said further reacting is conducted at least twice, and the reaction product is dried is between each reacting step, to form a final reaction product.

20. A process according to claim 19 further comprising contacting the final reaction product with at least an organoaluminum cocatalyst, and optionally, an olefin.

* * * * *